United States Patent [19]

Dobbelaar et al.

[11] Patent Number: 6,096,858
[45] Date of Patent: Aug. 1, 2000

[54] REMOVING RESIDUAL VOLATILES FROM POLYMER DISPERSIONS

[75] Inventors: Johannes Dobbelaar, Wachenheim; Wolfgang Hübinger, Limburgerhof; Peter Keller, Hirschberg; Bernd Stanger, Dudenhofen, all of Germany

[73] Assignee: BASF Aktiengesellschaft, Ludwigshafen, Germany

[21] Appl. No.: 09/338,430

[22] Filed: Jun. 23, 1999

[30] Foreign Application Priority Data

Jun. 24, 1998 [DE] Germany .................. 198 28 183

[51] Int. Cl.$^7$ ............................................. C08F 6/00
[52] U.S. Cl. .................................. 528/499; 528/480
[58] Field of Search ............................ 528/480, 499

[56] References Cited

U.S. PATENT DOCUMENTS

| | | | |
|---|---|---|---|
| 4,529,753 | 7/1985 | Taylor | 523/328 |
| 5,430,127 | 7/1995 | Kelly | 528/500 |

FOREIGN PATENT DOCUMENTS

| | | |
|---|---|---|
| 0 003 957 | 9/1979 | European Pat. Off. . |
| 650977 | 4/1995 | European Pat. Off. . |
| 0 650 977 | 5/1995 | European Pat. Off. . |
| 196 21 027 | 11/1997 | Germany . |
| 197 41 189 | 3/1999 | Germany . |

OTHER PUBLICATIONS

Chemical Abstracts, AN 90–379P, DE 1,248,943, Jul. 20, 1965.
Derwent Abstracts, AN 98–010108, DE 196 21 027, Nov. 27, 1997.
Derwent Abstracts, DE 19716373, Apr. 18, 1997 corresponding abstract of WO 97/45184 Dec. 4, 1997.

*Primary Examiner*—Terressa M. Boykin
*Attorney, Agent, or Firm*—Oblon, Spivak, McClelland, Maier & Neustadt, P.C.

[57] ABSTRACT

The process of the present invention for removing residual volatiles from polymer dispersions by performing first chemical deodorization using an initiator to remove residual monomers and then physical deodorization to remove volatile constituents comprises conducting the chemical deodorization for as long as the decrease in monomers is greater than the increase in secondary components introduced into the dispersion by the initiator, to result reliably in polymer dispersions having a residual volatiles content of less than or equal to 100 ppm.

11 Claims, No Drawings

REMOVING RESIDUAL VOLATILES FROM POLYMER DISPERSIONS

The present invention relates to a process for removing residual volatiles from polymer dispersions by performing first chemical deodorization to remove residual monomers and then physical deodorization to remove volatile components.

Polymer dispersions or suspensions obtained by emulsion or suspension polymerization normally include unwanted volatile organic constituents, such as residual monomers from incomplete conversion, impurities from the starting materials, initiator decomposition products, or products of low molecular mass from secondary reactions. These components are referred to in general as residual volatiles.

Basically, there are two methods of removing residual volatiles: chemical and physical deodorization. In chemical deodorization, a postpolymerization involving an initiator different from that used in the main polymerization converts extant polymerizable components—primarily the monomers employed—into oligomers and polymers which are no longer volatile. In this case, a redox initiator system is generally employed.

Chemical deodorization has the drawback that only the polymerizable residual volatiles can be eliminated. All saturated secondary components from impurities of the starting materials and secondary reactions of the monomers remain as residual volatiles in the product. At the same time, chemical deodorization brings with it further secondary components, examples being acetone and t-butanol when t-butyl hydroperoxide/acetone bisulfite are used, and formaldehyde and t-butanol when t-butyl hydroperoxide/sodium hydroxymethanesulfinate are used as the redox initiator system. Both the impurities and the newly introduced substances remain in the dispersion as residual volatiles and disrupt its processing.

In the case of physical deodorization, the dispersion is stripped with (generally) steam in a stirred vessel (DE 12 48 943) or in a countercurrent column (DE-A-196 21 027.5 and DE-197 16 373.4), which removes all volatiles having a boiling point of up to about 200° C. The volatile components include monomers whose propensity to undergo full reaction is relatively poor and which, following polymerization, may still be present in amounts of more than 1% in the dispersion. With physical deodorization, these monomers are stripped off and so pass into the wastewater. This entails not only a loss of target product but also expensive disposal of the wastewater. In addition, water-soluble monomers, which may be toxic, cannot be stripped.

Physical and chemical deodorization may also be employed simultaneously, as is described in U.S. Pat. No. 4,529,753. However, it has been found in this case that the removal by stripping of components of the redox initiator system reduces the effectiveness of chemical deodorization.

A method of removing residual monomers from polymer dispersions containing at least 50% by weight of vinyl acetate units which involves sequential application of chemical and physical deodorization is described in EP 650 977 A. In comparison to the process of U.S. Pat. No. 4,529,753, this method is said to result in lower residual monomer concentrations within an acceptable time frame. To achieve this, the dispersion is first treated with a sufficient amount of an initiator system until the residual monomer content is reduced to 1500–6000 ppm. There then follows physical deodorization with steam under subatmospheric pressure, in the course of which the residual monomer content is reduced to about 5–500 ppm. This method does not make it possible to keep reliably within residual volatile concentrations of $\leq 100$ ppm, especially in the presence of relatively high-boiling monomers such as styrene and n-butyl acetate.

It is an object of the present invention to provide an improved process for deodorizing polymer dispersions which permits reliable preparation of polymer dispersions containing $\leq 100$ ppm of residual volatiles.

We have found that this object is achieved by a process for removing residual volatiles from polymer dispersions by treating said dispersions first with an initiator, especially a redox initiator system, to remove residual monomers (chemical deodorization) and then with an inert gas to remove volatile constituents (physical deodorization), which comprises conducting the chemical deodorization for as long as the decrease in monomers is greater than the increase in secondary components introduced into the dispersion by the initiator.

The chemical deodorization is carried out under conditions which lead to polymerization of the residual monomers and is ended as soon as the amount of residual monomers eliminated is approximately equal to the amount of secondary components introduced into the dispersion. In many cases, this equilibrium is reached when 90% of the residual monomers has been removed. At this point, in general, a residual monomer content of about 1200 ppm, in particular about 900 ppm, has been reached.

As the initiator it is possible in principle to employ all initiators and redox initiator systems, comprising an oxidizing agent and a reducing agent, that are suitable for this purpose. Examples of suitable oxidizing agents are hydrogen peroxide and organic peroxides, such as benzoyl peroxide, t-butyl hydroperoxide, and the like. Examples of suitable reducing agents are hydroxymethanesulfinic acid and its salts, especially the sodium salt, ascorbic acid, sodium metabisulfite, acetone bisulfite, and the like. Tried and tested systems include hydrogen peroxide/ascorbic acid, t-butyl hydroperoxide/acetone bisulfite, and t-butyl hydroperoxide/sodium hydroxymethanesulfinate.

To control the formation of free radicals it is common to employ a transition metal salt as well. Examples of suitable salts are iron(II) chloride and iron(III) chloride, ammonium iron sulfate, and vanadium(II) sulfate (vanadyl sulfate).

The initiator is generally used in an amount from 0.01 to 1% by weight, in particular from 0.05 to 0.3% by weight, based on the overall weight of the monomers employed originally. The temperature at which chemical deodorization is carried out is guided by the initiator that is used. It is generally within the range from 30 to 100° C., in particular from 50 to 80° C.

Chemical deodorization generally takes place for a period of from about 10 minutes to about 60 minutes. Preferably, the initiator system is added continuously or in portions essentially throughout the period of chemical deodorization. Surprisingly it has been found that in this way the chemical deodorization is more effective than if the initiator system is added over only part of the period.

The chemical deodorization is followed by the physical deodorization by treatment—stripping, for example—with steam or other inert gases, such as air, nitrogen or supercritical carbon dioxide, under conditions which lead to the removal of residual volatiles.

Physical deodorization can be performed in customary apparatus and under customary conditions (from 50 to 100° C., from 0.2 to 1 bar). It has proven particularly preferable to carry out physical deodorization by the technique described in DE 12 48 943 or in a countercurrent column.

Said column is equipped preferably with dual-flow sieve trays and/or cross-flow sieve trays, with preferably from 5 to 50 of said trays being employed. Preferably, the countercurrent column is configured such that the specific open area in the dual-flow sieve trays is from 2 to 25% and in the cross-flow sieve trays is from 1 to 10%, and the mean perforation diameter is from 10 to 50 mm in the dual-flow sieve trays and from 2 to 10 mm in the cross-flow sieve trays.

The stripping gas is preferably passed in countercurrent to the dispersion at a column pressure of from 0.1 to 1.5 bar, in particular from 0.2 to 0.7 bar.

Suitable countercurrent columns are described in DE 196 21 027 A and DE 197 16 373 A, the full content of which is hereby incorporated into the present text by reference.

Using the process of the invention it is possible in principle to treat all polymer dispersions and suspensions prepared by emulsion or suspension polymerization. The process is particularly suited to deodorizing polymer dispersions in which the polymer has been built up from:

A) from 50 to 100% by weight, in particular from 80 to 100% by weight, of at least one monomer selected from vinylaromatic monomers, such as styrene, α-methylstyrene and vinyltoluene; esters of vinyl alcohol with $C_1$–$C_{12}$ monocarboxylic acids, such as vinyl acetate, vinyl propionate and vinyl laurate; esters of allyl alcohol with $C_1$–$C_{12}$ monocarboxylic acids, such as allyl acetate and allyl propionate; esters of preferably $C_3$–$C_6$ α,β-monoethylenically unsaturated mono- and dicarboxylic acids, such as acrylic acid, methacrylic acid, maleic acid, fumaric acid and itaconic acid, with generally $C_1$–$C_{12}$-, preferably $C_1$–$C_8$- and, in particular, $C_1$–$C_4$-alkanols, such as methyl, ethyl, n-butyl, isobutyl, t-butyl and 2-ethylhexyl acrylate and methacrylate; acrylonitrile and methacrylonitrile; and also 1,3-butadiene and isoprene, and B) from 0 to 50% by weight, in particular from 0 to 20% by weight, of comonomers selected from $C_3$–$C_6$ α,β-monoethylenically unsaturated mono- and dicarboxylic acids and their amides, such as acrylic acid, methacrylic acid, maleic acid, fumaric acid, itaconic acid, acrylamide and methacrylamide, and also vinylsulfonic acid and its water-soluble salts; monoesters of $C_2$–$C_4$ diols with acrylic or methacrylic acid, such as hydroxyethyl acrylate and hydroxypropyl methacrylate; and amino $C_2$–$C_4$-alkyl (meth)acrylates and the N-monoalkyl and N,N-dialkyl derivatives thereof.

Monomers A used are preferably vinylaromatic monomers, especially styrene, esters of acrylic or methacrylic acid, acrylonitrile, methacrylonitrile, and butadiene, or mixtures thereof. In the case of mixtures it is also possible for esters of vinyl alcohol and a $C_1$–$C_{12}$ monocarboxylic acid, especially vinyl acetate, to be present in amounts of <50% by weight, especially <30% by weight (based on the overall amount of monomers A).

The polymer dispersions may also include all customary auxiliaries and additives, such as emulsifiers, protective colloids, water-miscible solvents, etc.

The process of the invention has the advantage that the amounts of initiator and stripping gas required are minimized. Despite this it is possible reliably to prepare polymer dispersions with ≦100 ppm, especially ≦70 ppm and in some cases even ≦50 ppm residual volatiles.

The examples which follow illustrate the invention without restricting it.

EXAMPLE 1

An n-butyl acrylate-acrylonitrile dispersion prepared by emulsion polymerization and having a solids content of 55% by weight was used for interior adhesive applications. Following polymerization this dispersion still contained 9800 ppm of residual volatiles. Of these about 800 ppm are saturated unpolymerizable impurities from the starting materials and about 9000 ppm are residual monomers, principally butyl acrylate.

A chemical deodorization was performed at 70° C. using the initiator system comprising t-butyl hydroperoxide/acetone bisulfite (0.11% by weight t-butyl hydroperoxide, based on the amount of monomers employed) until the monomers had been depleted by 90%, i.e., to 900 ppm (60 minutes). In the course of this procedure, about 500 ppm of secondary components were introduced by the redox initiator system.

This was followed by a physical deodorization in which the dispersion was treated with 25% by weight of steam, based on the dispersion, in a countercurrent column as described in the figures of DE 197 16 373.4. The column-head pressure was 0.3 bar. The sum of residual volatiles in the dispersion after a single passage through the column was 45 ppm.

EXAMPLE 2

A dispersion of styrene/butadiene/butyl acrylate with a solids content of 50% by weight was used for coating paper. Following polymerization, the dispersion still contained 4000 ppm of residual monomers and 1000 ppm of other residual volatiles from the starting materials and from secondary reactions.

Chemical deodorization was carried out at 70° C. using the redox initiator system (0.18% by weight, based on the amount of monomers employed) comprising t-butyl hydroperoxide/acetone bisulfite until the monomers had been depleted by 90% (60 minutes). At that point the dispersion contained about 400 ppm of monomers and about 1000 ppm of acetone and t-butanol. Subsequently, physical deodorization was effected as described in Example 1. The resulting dispersion contained 55 ppm of volatile constituents.

We claim:

1. A process for removing residual volatiles from polymer dispersions by performing first chemical deodorization using an initiator to remove residual monomers and then physical deodorization to remove volatile constituents, which comprises conducting the chemical deodorization for as long as the decrease in residual monomers is greater than the increase in secondary components introduced into the dispersion by the initiator.

2. A process as claimed in claim 1, wherein chemical deodorization is conducted until 90% of the residual monomers has been removed.

3. A process as claimed in claim 1, wherein chemical deodorization is conducted until a residual monomer content of about 900 ppm has been reached.

4. A process as claimed in claim 1, wherein the initiator used is t-butyl hydroperoxide/acetone bisulfite or t-butyl hydroperoxide/hydroxymethanesulfinate.

5. A process as claimed in claim 1, wherein the initiator is added throughout the period of chemical deodorization.

6. A process as claimed in claim 1, wherein the physical deodorization is conducted until the sum of all volatile components is ≦100 ppm.

7. A process as claimed in claim 1, wherein the physical deodorization is conducted with steam.

8. A process as claimed in claim 1, wherein the physical deodorization is conducted in a countercurrent column.

9. A process as claimed in claim 8, wherein said countercurrent column is equipped with dual-flow sieve trays and/or cross-flow sieve trays.

10. A process as claimed in claim 9, wherein the specific open area in the dual-flow sieve trays is from 2 to 25% and in the cross-flow sieve trays is from 1 to 10% and the mean perforation diameter is from 10 to 50 mm in the dual-flow sieve trays and from 2 to 10 mm in the cross-flow sieve trays.

11. A process as claimed in claim 8, wherein the steam is guided in countercurrent to the dispersion at a column pressure of from 0.1 to 1.5 bar.

* * * * *